United States Patent
Luo et al.

(10) Patent No.: US 11,611,987 B2
(45) Date of Patent: Mar. 21, 2023

(54) METHOD AND DEVICE FOR DETECTING PARTIAL DISCONTINUOUS TRANSMISSION (DTX) USING SOFT BITS CORRELATION

(71) Applicant: Hong Kong Applied Science and Technology Research Institute Co., Ltd, Shatin (HK)

(72) Inventors: Yaming Luo, Kowloon (HK); Yunxiang Yao, Sai Kung (HK); Man Wai Kwan, Ma On Shan (HK); Xiangyu Liu, Shenzhen (CN); Shuaimin Jiang, Tai Po (HK); Kong Chau Tsang, Kowloon (HK)

(73) Assignee: Hong Kong Applied Science and Technology Research Institute Co., Ltd, New Territories (HK)

( * ) Notice: Subject to any disclaimer, the term of this patent is extended or adjusted under 35 U.S.C. 154(b) by 191 days.

(21) Appl. No.: 17/141,725

(22) Filed: Jan. 5, 2021

(65) Prior Publication Data

US 2022/0217710 A1    Jul. 7, 2022

(51) Int. Cl.
*H04W 72/21* (2023.01)
*H04L 5/00* (2006.01)
(Continued)

(52) U.S. Cl.
CPC .......... *H04W 72/21* (2023.01); *H04L 1/0026* (2013.01); *H04L 1/1671* (2013.01); *H04L 1/1861* (2013.01); *H04L 5/0055* (2013.01)

(58) Field of Classification Search
CPC ............ H04W 72/0413; H04L 1/0026; H04L 1/1671; H04L 1/1861; H04L 5/0055; H04L 1/1819; H04L 5/0053; H04L 1/0045
(Continued)

(56) References Cited

U.S. PATENT DOCUMENTS 8,315,185 B2    11/2012  Chan
9,414,431 B2    8/2016   Sandoi et al.
(Continued)

FOREIGN PATENT DOCUMENTS

CN    104168095 A    11/2014
CN    105491591 A    4/2016
(Continued)

OTHER PUBLICATIONS

Ericsson, "Transmission of ACK/NACK on PUSCH for LTE TDD", R1-083371, Aug. 18-22, 2008. (From Applicant's IDS) (Year: 2008).*
(Continued)

*Primary Examiner* — Mang Hang Yeung
(74) *Attorney, Agent, or Firm* — GableGotwals

(57) ABSTRACT

Described is a method and device for detecting a discontinuous transmission (DTX) state or a partial DTX state at an uplink control information (UCI) receiver in a wireless communication system. The method comprises receiving a linear block encoded signal on an uplink (UL) at said UCI receiver and processing said signal after resource element (RE) demapping to obtain a soft bit sequence. The soft bit sequence is then transformed into multiple sub-sequences. Correlation metrics are determined for two or more of the multiple sub-sequences or two or more sub-sequence groups derived from the multiple sub-sequences or sequence segments derived from the sub-sequence groups. Then, a determination is made if a DTX state has occurred by evaluating the determined correlation metrics.

20 Claims, 13 Drawing Sheets

(51) Int. Cl.
  *H04L 1/00* (2006.01)
  *H04L 1/1607* (2023.01)
  *H04L 1/1829* (2023.01)

(58) Field of Classification Search
  USPC .......................................................... 370/329
  See application file for complete search history.

(56) References Cited

U.S. PATENT DOCUMENTS

| | | | |
|---|---|---|---|
| 2013/0176924 A1* | 7/2013 | Kishiyama | H04L 1/1614 370/311 |
| 2015/0237674 A1* | 8/2015 | Sandoi | H04W 76/28 370/252 |
| 2019/0335529 A1 | 10/2019 | Guo et al. | |
| 2020/0235864 A1 | 7/2020 | Li et al. | |

FOREIGN PATENT DOCUMENTS

| | | | |
|---|---|---|---|
| CN | 105847199 A | 8/2016 | |
| CN | 108075862 A | 5/2018 | |

OTHER PUBLICATIONS

Ericsson, "Transmission of ACK/NAK on PUSCH for LTE TDD 3GPP TSG-RAN WGI #54 R1-083371", Aug. 18, 2008, Published in: Jeju, South Korea.

\* cited by examiner

If $\rho \leq$ Th ==> isDTX =1,
Else==> try another assumption

METHOD AND DEVICE FOR DETECTING PARTIAL DISCONTINUOUS TRANSMISSION (DTX) USING SOFT BITS CORRELATION

FIELD OF THE INVENTION

The invention relates particularly, but not exclusively, to an improved method and device for detection of discontinuous transmission (DTX) on an uplink (UL) at an uplink control information (UCI) receiver in a wireless communication network using soft bits correlation. The invention relates particularly to detection of partial DTX in small block encoded signals.

BACKGROUND OF THE INVENTION

In long-term evolution (LTE) communications systems, in a downlink (DL), a data payload is carried by transport blocks which are encoded into codewords which are sent over a DL physical data channel called the Physical Downlink Shared Channel (PDSCH). The scheduling information of the PDSCH codeword(s), including its resource allocation in the subframe and its modulation and coding scheme, is included in the physical control channel, called the Physical Downlink Control Channel (PDCCH). Generally, the receiving user equipment (UE) decodes the messages in PDCCH and, where it finds that a PDSCH has been assigned to it, it decodes the PDSCH codeword(s) according to the scheduling information decoded from the PDCCH. In other words, correctly decoding PDCCH is a prerequisite for properly decoding PDSCH.

In order to prevent the loss of transport blocks, LTE has adopted the Hybrid Automatic Repeat Request (HARQ) scheme. In the physical layer of Evolved UMTS Terrestrial Radio Access Network (E-UTRA), HARQ is implemented both in the UL and the DL. The acknowledgement message in E-UTRA is denoted as HARQ-ACK.

HARQ-ACK may be transmitted by the UE in response to certain PDSCH transmissions and includes one or several acknowledgements, either positive (ACK) or negative (NACK) in response to transport blocks transmitted in the DL. HARQ-ACK may be transmitted on one of the physical channels Physical Uplink Control Channel (PUCCH) or Physical Uplink Shared Channel (PUSCH).

But if the UE is not able to correctly decode the PDCCH, it cannot correctly decode PDSCH, and may even not know that it needs to send the HARQ feedback. This is called Discontinuous Transmission (DTX).

If the eNodeB (base station (BS)) detects ACK instead of DTX, a so called ACK false detection, the eNodeB will erroneously consider the corresponding DL transport block as correctly received. Since the transport block has not been correctly received by the UE, corresponding data will not be passed to the Medium Access Control (MAC) layer and from the MAC layer to the Radio Link Control (RLC) layer. Data will hence be missing in the RLC layer. This will cause ARQ retransmissions in the RLC layer which introduce delay and possibly large retransmissions which is very undesirable. Also, if a NACK is detected erroneously that in reality is DTX, the eNodeB will retransmit the packet in such a way that the UE will not be capable of decoding it.

As already indicated, a problem arises when the UE is not aware of the presence of the PDSCH assigned to it if it fails to decode the PDCCH successfully. In this case the UE will not generate ACK/NACK information. This situation has been well recognized and the UE response in such case is DTX, that is, neither an ACK nor a NACK signal is transmitted to the eNodeB. Since the eNodeB has no prior knowledge of whether the UE has failed to detect the PDCCH, it expects or deems, that the symbols of the predetermined positions are ACK/NACK symbols and extracts them for the ACK/NACK decoder to decode. If the eNodeB disregards the possibility of DTX, either an ACK or NACK message will be returned by the ACK/NACK decoder to a higher layer upon the decoding of the extracted symbols, which are, in fact, conveying no information. In general, both ACK and NACK messages are equally likely to be returned.

The consequence of wrongly detecting a DTX as an ACK is more adverse to the system performance than wrongly detecting a DTX as a NACK.

Similarly, in 5G (or new radio (NR)) wireless communication systems, a message feedback scheme is also used for re-transmission control. ACK or NACK (AN) signals are used to indicate whether the signal is received successfully or not by the UE and whether the BS needs to retransmit the data. If the UE misses a DL control signal, the UE may encounter DTX in DL and the UE will not send any message back to the BS. However, the BS needs to detect one of three possible feedback states, i.e., ACK, NACK or DTX, for rearranging a next transmission to the UE.

FIG. 1 illustrates a method by which UL signals from the UE to the BS control transmission of payload control data and payload data on the DL from the BS to the UE. In the example of FIG. 1, it can be seen that, in response to a first "DL control for payload allocation #1" message from the BS to the UE, the UE, in this instance, responds with a UCI "NACK" message. The NACK message is received by the UCI receiver at the BS and, as a consequence, the BS is configured to retransmit to the UE the first "DL control for payload allocation #1" message and its associated first "DL payload data #1" message. In this example, the UE then returns a UCI "ACK" message to the UCI receiver in response to the retransmitted control signal message and, as a consequence, the BS is configured to then transmit to the UE the second "DL control for payload allocation #2" message and its associated second "DL payload data #2" message (not shown in FIG. 1). FIG. 1 therefore illustrates how data is retransmitted by the BS to the UE when the UE indicates that is has not successfully received a DL data control message.

In contrast, FIG. 2 illustrates what may happen when the UE misses a DL data control message. In this example, the UE has missed the first "DL control for payload allocation #1" message and consequently sends no ACK/NACK message back to the BS in response. This scenario represents a DTX state. The UCI receiver at the BS only receives noise but processes this as though it comprises an UL UCI signal with the result that, in this example, the UCI falsely detects or determines receipt of an ACK message from the UE and thus outputs a false ACK message. This causes the BS to commence a new control and payload data transmission in response to the false ACK message, e.g., "DL control for payload allocation #2", etc.

For 5G UCI, 3GPP Technical Specification 38.212 requires the support of two types of channel codes, namely polar code and small block code as illustrated respectively by FIGS. 3 and 4. Polar code relates to the situation where the number of payload bits is greater than 11. Small block code relates to the situation where the number of payload bits is equal to or less than 11.

As shown in FIG. 3, in a conventional polar code-based receiver, a cyclic redundancy check (CRC) may assist in detecting whether or not DTX occurs. The output from the polar code decoder comprises UCI bits but the CRC check function (module) enables the polar code-based receiver to distinguish between DTX on the one hand and UCI bits indicative of ACK or NACK on the other hand.

In FIG. 4 which shows a conventional small block code-based receiver where a CRC function is not available, incorrect detection of the ACK, NACK, or DTX signals leads to a waste of resources for retransmission and/or a loss of data packets. In the conventional small block code-based receiver where CRC is not available, ACK and NACK each issue with about 50% probability where the UE misses a DL control message and transmits nothing to the UE such that the BS receives only noise. In the small block code-based receiver, the output from the small block code decoder is assumed to be UCI bits leading to possible false ACK or false NACK outcomes. In other word, there is no means for distinguishing between DTX on the one hand and UCI bits indicative of ACK or NACK on the other hand.

In the conventional small block code-based UCI receiver of FIG. 4, the resource element (RE) demapper output will be treated by an equalizer module to generate an equalized signal. The equalized signal will then be treated by a demodulation module to generate a demodulated soft bit sequence (SEQ). The demodulated soft bit SEQ will be handled by a descrambling module to create a descrambled soft bit SEQ. The descrambled soft bit SEQ will then be handled by a rate de-matching module to create a de-matched soft bit SEQ. The de-matched soft bit SEQ will be decoded through a decoder for small block code module to generate UCI bits (ACK/NACK). The soft bits comprise real signal values which differ from hard bits which are resolved to binary values.

As already explained with respect to FIGS. 1 and 2, if a UE loses a DL control signal, the UE will not send UCI ACK/NACK feedback. i.e., a DTX state will occur. The BS treats DTX as an unsuccessful DL transmission. Re-transmission is required if and when DTX occurs. But if the DTX is falsely detected as ACK, re-transmission will not be performed. More especially, DTX may occur only partially, i.e., only pan of the UCI payload bits may be missing. Compared with full DTX where all UCI bits are missing, partial DTX is much more difficult to detect. From a perspective of the small block code-based UCI receiver, a partial DTX codeword still belongs to the set of valid codewords. In view of the fact that the small block code-based UCI receiver has no CRC check to assist with full or partial DTX detection, there is a need to be able to effectively detect partial DTX, i.e., there is a need to effectively distinguish a partial DTX signal from a non-DTX signal.

CN104168095 discloses a UCI receiver device which is configured to decode the descrambled sequence to obtain a received UCI b. It then obtains a canonical sequence by selecting a sub-sequence with 32 soft bits from the descrambled sequence. It decodes the canonical sequence to obtain a canonical UCI r. It then compares the received UCI with the canonical UCI r to determine if a DTX state has occurred. This is a highly complex solution which requires a high signal to noise ratio (SNR) to decode UCI. It is difficult to select a suitable canonical sequence. It does not make use of an adjustable threshold.

CN105491591 discloses a UCI receiver device which is configured to divide the descrambled sequence into N blocks each containing 32 soft bits. It then compares the signs of soft bits in a first block with all other N−1 blocks. It computes the number of same sign pairs as a, and the number of different sign pairs as b. It compares the ratio a/b with a predetermined DTX threshold value Th. If a/b is less than or equal to Th then a DTX state is determined to have occurred, but, if a/b is greater than Th, then no DTX state is determined to have occurred. The DTX decision is a hard decision based on the signs of the soft bits. The decision is sensitive to the noise or UL channel impairment. If the number of non-DTX blocks of the N blocks is much higher than the number of DTX blocks then the ratio a/b can still be high meaning that it is hard to determined if a DTX state has occurred using this metric. It is therefore difficult to detect DTX if only some RBs in any of the N blocks suffer DTX. Furthermore, different DTX scenarios between RBs within a 32 bit block are not considered.

U.S. Pat. No. 9,414,431 discloses a network node of a wireless communication network comprising a receiver receiving an input signal from a remote transmitter of the wireless communication system via a transmission channel. A SNR calculator is arranged to calculate a SNR of the received input signal. A soft bit normalizer is arranged to determine a plurality of normalized soft bits using the input signal. A primary detector is arranged to detect DTX on the transmission channel using the plurality of the normalized soft bits and the SNR, and if a DTX state on the transmission channel is detected, generate a DTX-decision or else trigger a refinement detector. The refinement detector is arranged to decode the normalized soft bits and to generate a further decision about whether the signal indicates a DTX state on the transmission channel using the decoded normalized soft bits. The decoding may comprise correlating the normalized soft bits with each of a plurality of predefined bit sequences to obtain a plurality of correlations. A maximum correlation amplitude is selected out of the pluralities of correlations. Then, the maximum correlation is compared to a predefined threshold. If the maximum correlation amplitude is larger than the predefined threshold, a non-DTX state is reported, else a DTX state is reported. This method is based on a maximum correlation amplitude.

CN105847199 discloses a method and device for detecting the ACK/NACK state on a PUSCH. The method comprises the following steps of: after ACK/NACK decoding is ended, determining whether DTX state detection is carried out or not according to the ACK/NACK information bit number, if DTX state detection is carried out, reconstructing an ACK/NACK bit sequence obtained by decoding through a base station so as to obtain a reconstructed bit sequence, operating the reconstructed bit sequence and a demodulated soft bit sequence so as to obtain a state decision value, comparing the decision value with a pre-set threshold, and determining whether a user terminal sends an ACK/NACK signal or not.

Among other things, what is therefore desired is a method for distinguishing a partial DTX signal from a non-DTX signal.

OBJECTS OF THE INVENTION

An object of the invention is to mitigate or obviate to some degree one or more problems associated with known methods of determining or detecting DTX on a UL at a UCI receiver in a wireless communication network.

The above object is met by the combination of features of the main claims; the sub-claims disclose further advantageous embodiments of the invention.

Another object of the invention is to provide a method of distinguishing a partial DTX signal from a non-DTX signal on a UL at a UCI receiver in a wireless communication network.

Another object of the invention is to provide an improved UCI receiver.

A further object of the invention is to provide an improved small block code-based UCI receiver.

One skilled in the art will derive from the following description other objects of the invention. Therefore, the foregoing statements of object are not exhaustive and serve merely to illustrate some of the many objects of the present invention.

SUMMARY OF THE INVENTION

The invention concerns a method to determine DTX when PUCCH carries the UCI feedback from a UE to a BS. Particularly, it is a method to effectively distinguish a partial DTX signal from a non-DTX signal on the UL to the UCI receiver.

More generally, the invention provides a method and a device for detecting a DTX state at a UCI receiver in a wireless communication system. The method comprises receiving a linear block encoded signal on a UL at said UCI receiver and processing said signal after resource element (RE) demapping to obtain a soft bit sequence (SEQ). The soft bit sequence is then transformed into multiple sub-sequences. Correlation metrics are determined for two or more of the multiple sub-sequences or two or more sub-sequence groups derived from the multiple sub-sequences or some sequence segments derived from the sub-sequence groups. Then, a determination is made if a DTX state has occurred by evaluating the determined correlation metrics.

In a first main aspect, the invention provides a method for detecting a DTX state at a UCI receiver in a wireless communication system. The method comprises receiving a linear block encoded signal on a UL at said UCI receiver and processing said signal after RE demapping to obtain a soft bit sequence. The soft bit sequence is then transformed into multiple sub-sequences. Correlation metrics are determined for two or more of the multiple sub-sequences. It is then determined if a DTX state has occurred by evaluating the determined correlation metrics.

In one embodiment, the step of determining correlation metrics comprises: grouping the multiple sub-sequences into sub-sequence groups; determining correlation metrics for two or more of the sub-sequence groups; and determining if a DTX state has occurred by evaluating the determined correlation metrics for the two or more sub-sequence groups.

In another embodiment, the step of determining correlation metrics further comprises: segmenting each sub-sequence group into sequence segments; determining correlation metrics for sequence segments of two or more of the sub-sequence groups; and determining if a DTX state has occurred by evaluating the determined correlation metrics for the sequence segments of the two or more sub-sequence groups.

In a second main aspect, the invention provides a UCI receiver in a wireless communication system, the UCI receiver comprising: a memory storing machine-readable instructions; and a processor for executing the machine-readable instructions such that, when the processor executes the machine-readable instructions, it configures the UCI receiver to implement the method of the first main aspect of the invention.

In a third main aspect, the invention provides a non-transitory computer-readable medium storing machine-readable instructions, wherein, when the machine-readable instructions are executed by a processor of a UCI receiver in a wireless communication system, they configure the processor to implement the method of the first main aspect of the invention.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
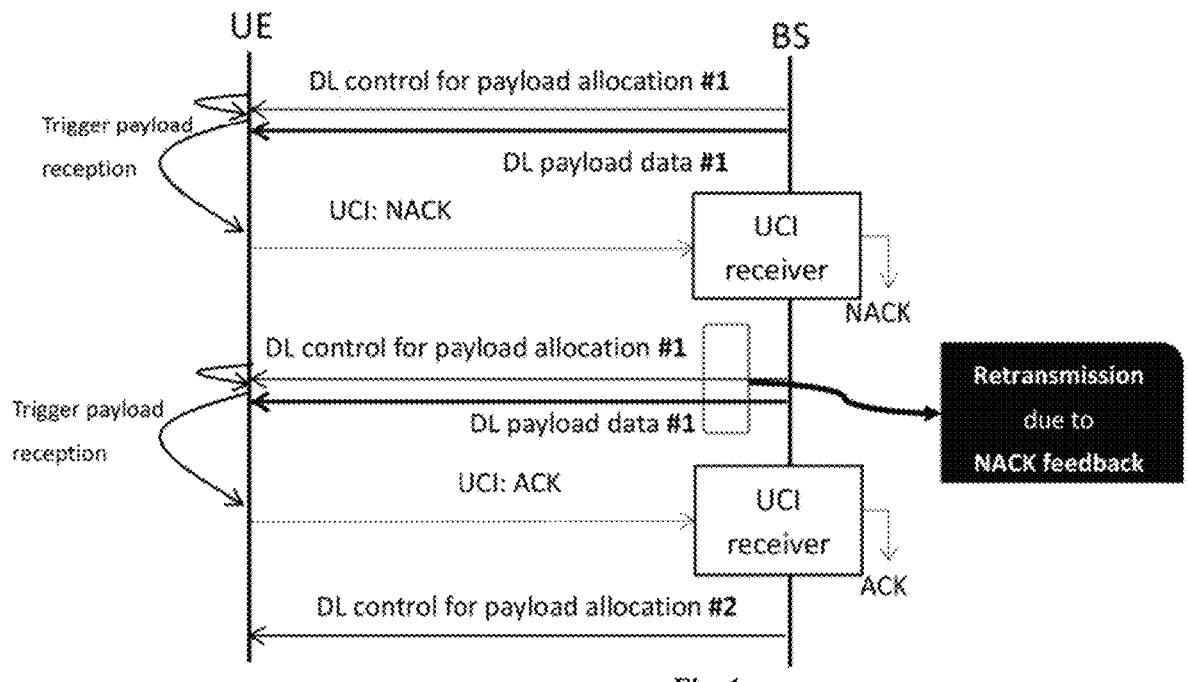
FIG. 1 is a signal diagram illustrating message exchanges between a BS and a UE for retransmission of control data and payload data.
Figure 2:
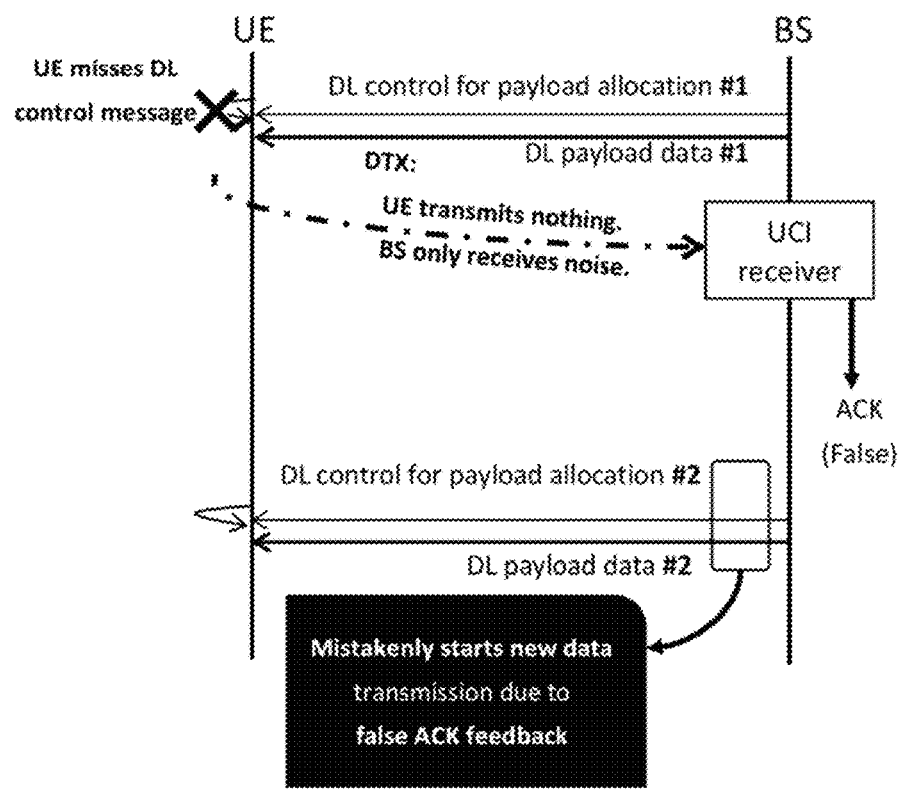
FIG. 2 is a signal diagram illustrating errant transmission of control data and payload data from a BS to a UE when a UCI receiver at the BS determines a false ACK message.
Figure 3:
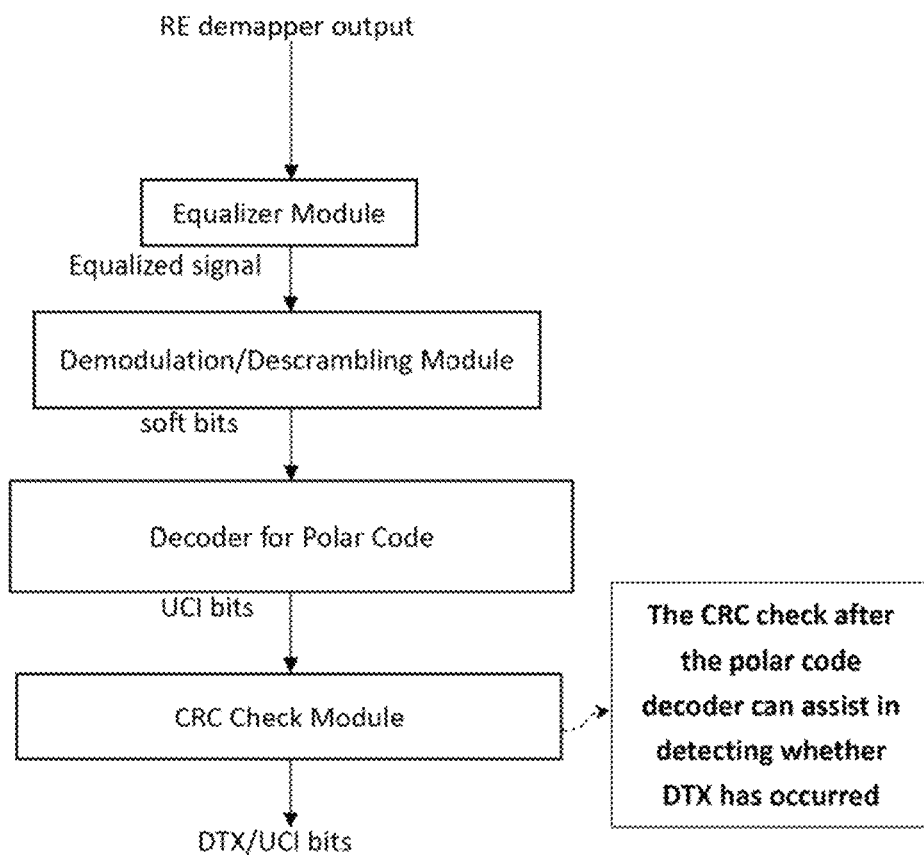
FIG. 3 is a block schematic diagram of a conventional polar code-based receiver for a 5G communications system.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS., may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 5:
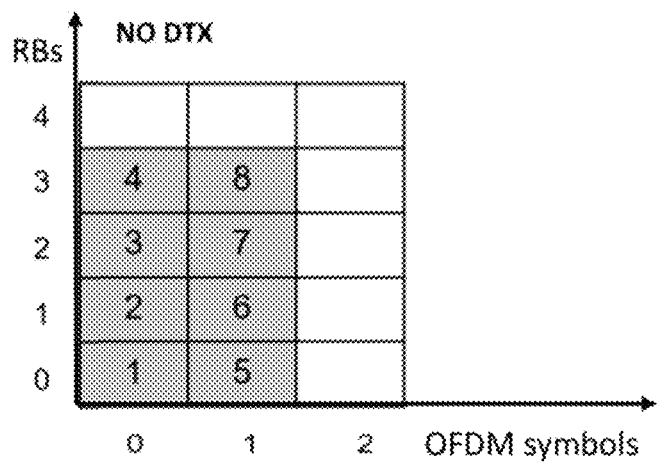
FIG. 5 illustrates an RE map for PUCCH Format 2 where no DTX state has occurred.

FIG. 5 illustrates a RE map for PUCCH Format 2 for a linear block encoded signal received at a small block code-based UCI receiver of a BS where no DTX state has occurred. In this case, all RBs or PUCCH units are successfully received, each of which comprises 16 bits for a total of 128 bits transmitted.

Figure 4:
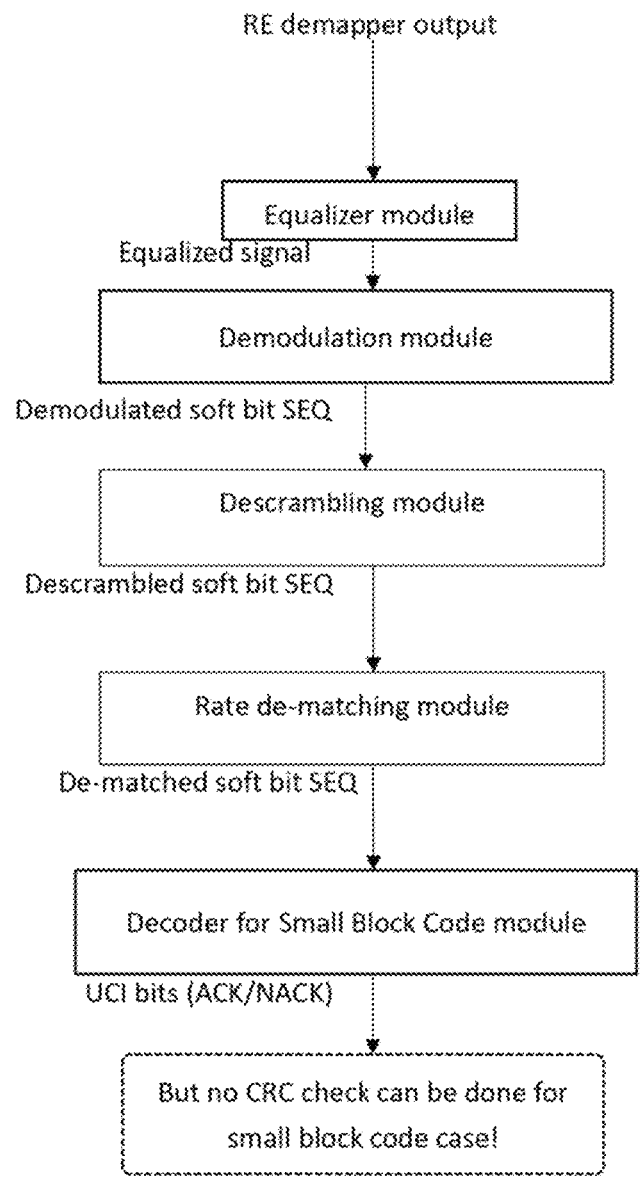
FIG. 4 is a block schematic diagram of a conventional small block code-based receiver for a 5G communications system.
Figure 6:
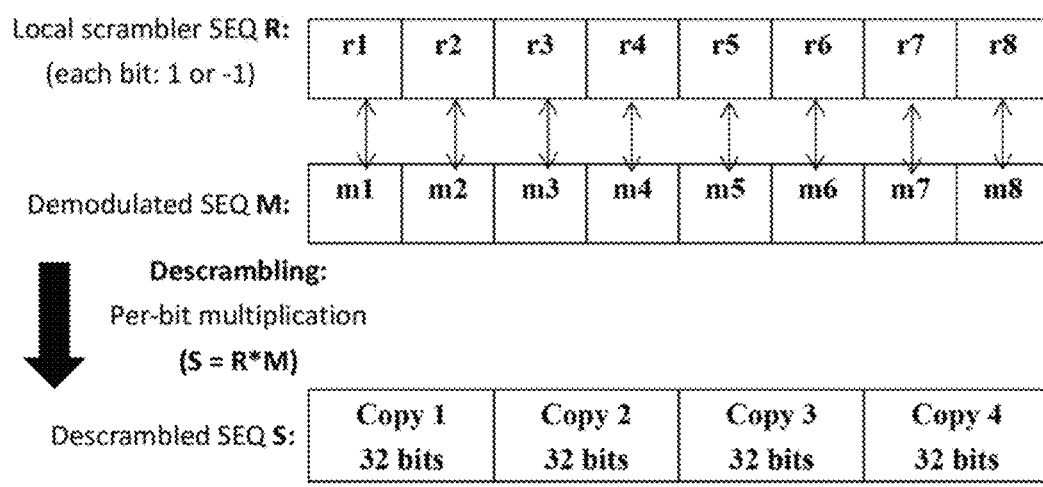
FIG. 6 illustrates the descrambling procedure for the RE map of FIG. 5 where no DTX state has occurred.

FIG. 6 illustrates the descrambling procedure for the RE map of FIG. 5 in which the local scrambled SEQ R comprising eight 16 bit blocks of r1 to r8 of hard bits having the binary values "1" or "−1" are demodulated in the demodulation module (FIG. 4) to provide a demodulated SEQ M comprising eight 16 bit blocks of soft bits m1 to m8. In this example, all of the r1 to r8 blocks of SEQ R are aligned with their respective blocks m1 to m8 of SEQ M which enables the descrambling module (FIG. 4) to descramble the demodulated SEQ M to provide a descrambled SEQ S (where S=R*M) comprising four valid 32 soft bit copies of the received linear block encoded signal.

By way of illustrating one of the technical problems addressed by the present invention, reference is now made to FIGS. 7 to 11.

Figure 7:
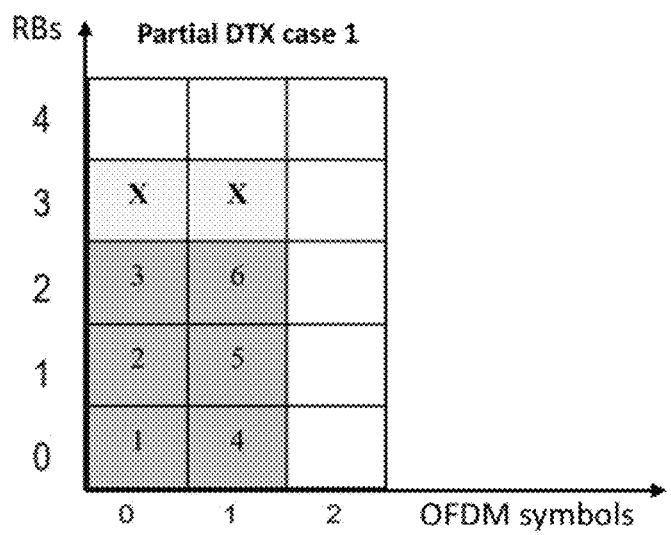
FIG. 7 illustrates an RE map for PUCCH Format 2 where a first partial DTX state has occurred.

FIG. 7 illustrates the RE map for PUCCH Format 2 for the linear block encoded signal received at the small block code-based UCI receiver of the BS where a first partial DTX state has occurred. In this instance, the last RB for each symbol is not successfully transmitted and noise denoted in FIG. 7 as "X" is received in each missing RB's place. However, the UCI receiver will assume that the received noise comprises a valid part of the received linear block encoded signal and will process it as such which may lead to a false ACK or NACK state. A partial DTX represents an unsuccessful DL transmission and needs to be treated as a DTX state. For a small block code-based UCI receiver, DTX is difficult to determine or detect, but partial DTX is especially difficult to detect or determine compared to a full DTX state where all of the RBs for the symbols are not successfully transmitted and only noise is received at the UCI receiver.

Figure 8:
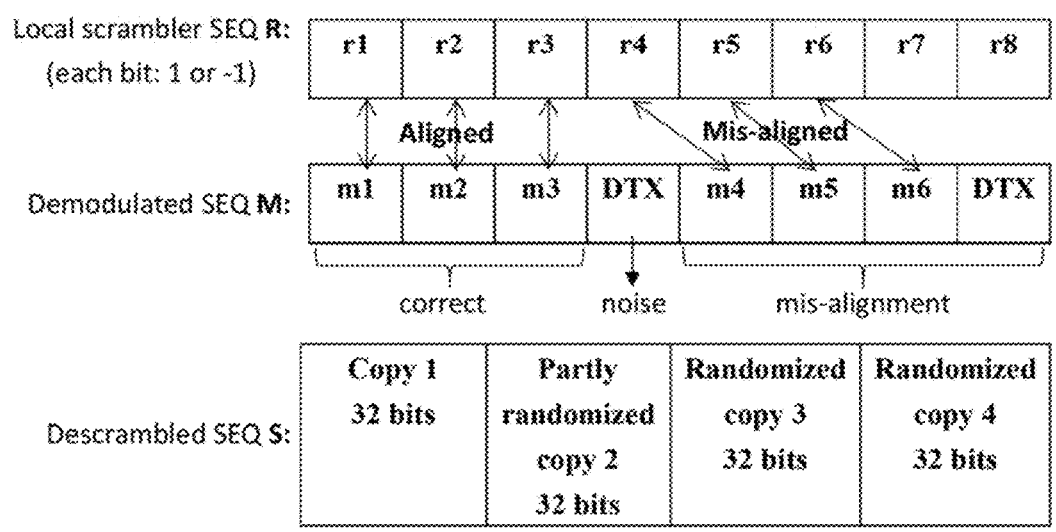
FIG. 8 illustrates the descrambling procedure for the RE map of FIG. 7 where a first partial DTX state has occurred.

FIG. 8 shows the descrambling procedure for the RE map of FIG. 7 where the first partial DTX state has occurred. Due to the partial DTX state, some copies of the received linear block encoded signal will be partially or fully randomized. In this case, only the blocks m1 to m3 of SEQ M are aligned with blocks r1 to r3 of SEQ R whereas blocks m4 to m6 of SEQ M are aligned with blocks r5 to r7 of SEQ R and thus mis-aligned with blocks r4 to r6 of SEQ R. SEQ M therefore comprises some correctly aligned blocks, some noise blocks and some mis-aligned blocks with the result that the descrambled SEQ S comprises one valid 32 bit copy of the received linear block encoded signal, a partially randomized copy and two fully randomized copies as shown in FIG. 8.

Figure 9:
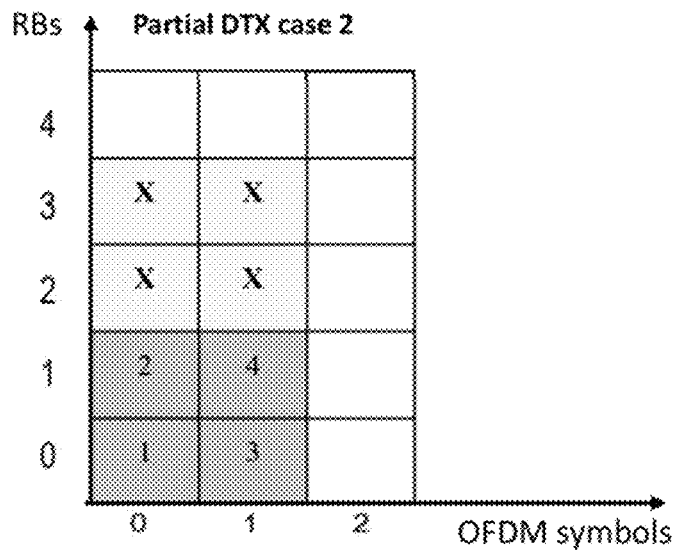
FIG. 9 illustrates an RE map for PUCCH Format 2 where a second partial DTX state has occurred.

FIG. 9 illustrates the RE map for PUCCH Format 2 for the linear block encoded signal received at the small block code-based UCI receiver of the BS where a second partial DTX state has occurred. In this instance, the last 2 RBs or PUCCH units for each symbol are not successfully transmitted and noise is received in each missing RB's place.

Figure 10:
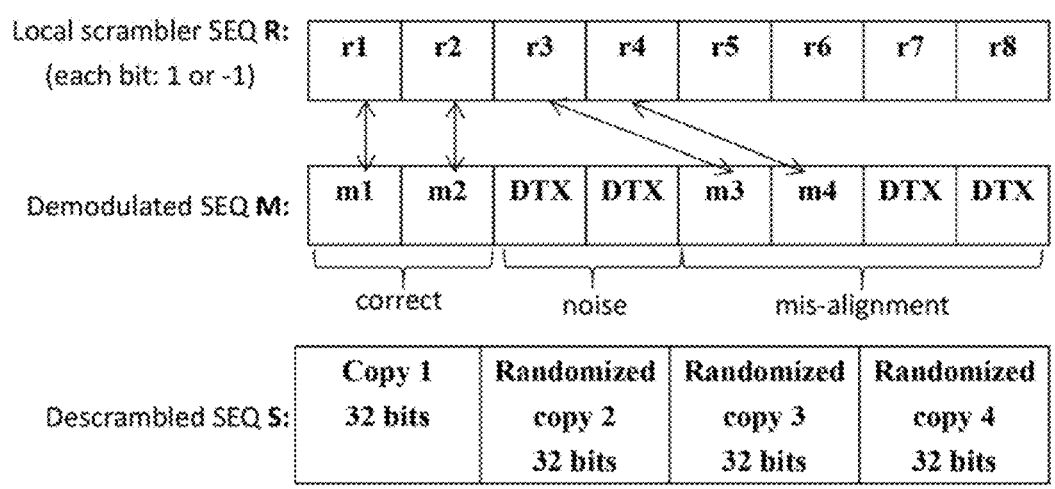
FIG. 10 illustrates the descrambling procedure for the RE map of FIG. 9 where a second partial DTX state has occurred.

FIG. 10 shows the descrambling procedure for the RE map of FIG. 9 where the second partial DTX state has occurred. In this case, only the blocks m1 to m2 of SEQ M are aligned with blocks r1 to r2 of SEQ R whereas blocks m3 to m4 of SEQ M are aligned with blocks r5 to r6 of SEQ R and thus mis-aligned with blocks r3 to r4 of SEQ R. SEQ M therefore comprises some correctly aligned blocks, some noise blocks and some mis-aligned blocks with the result that the descrambled SEQ S comprises one valid 32 bit copy of the received linear block encoded signal and three fully randomized copies.

The invention is therefore directed to solving at least the aforementioned technical problem by providing a method and a device in the form of a UCI receiver to detect a partial DTX state by distinguishing a partial DTX signal from a non-DTX signal.

Figure 11:
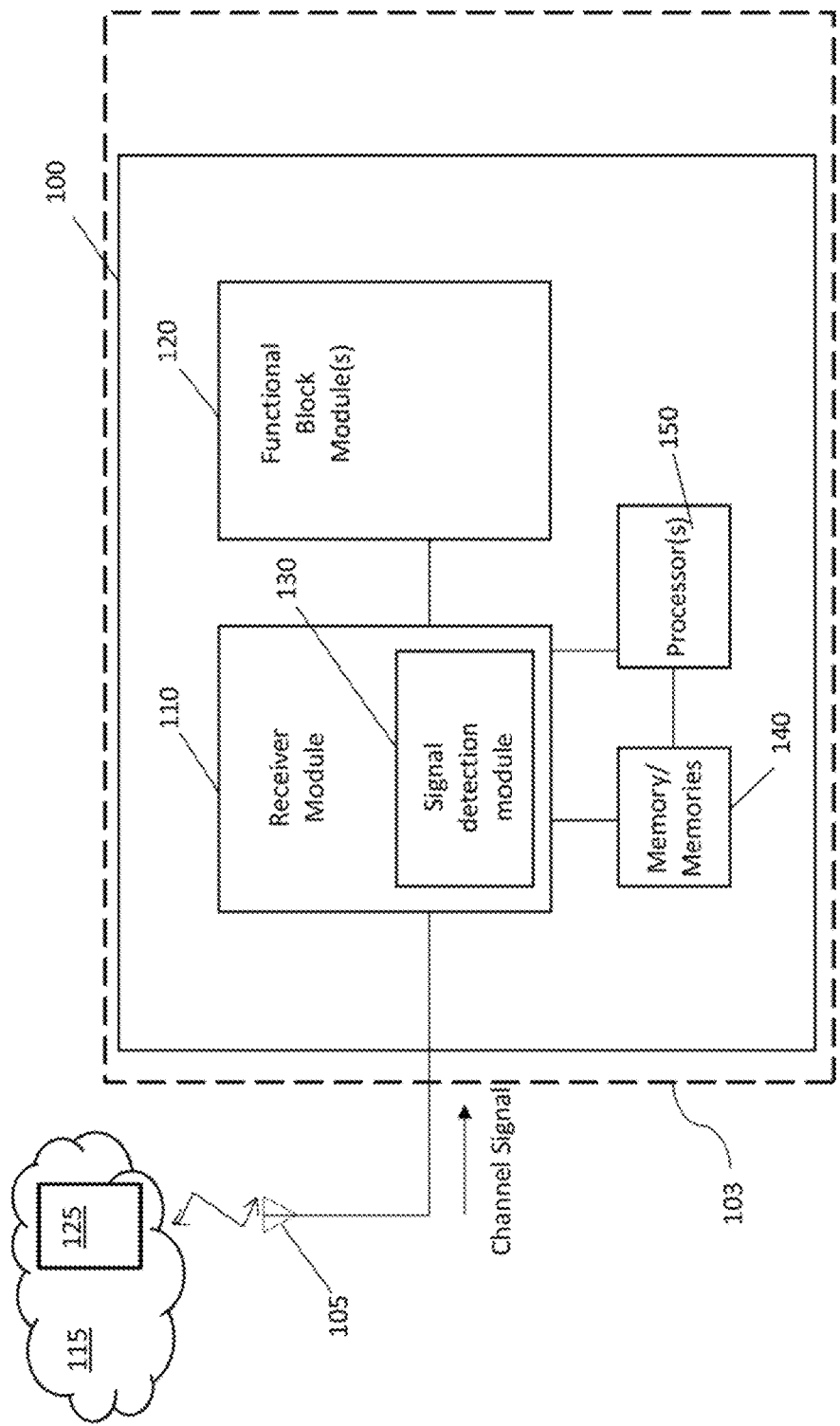
FIG. 11 is a block schematic diagram of an improved UCI receiver in accordance with the invention.

FIG. 11 shows an exemplary embodiment of an improved UCI receiver 100 in accordance with concepts of the present invention. In the illustrated embodiment, the UCI receiver 100 may comprise communication equipment such as a network node, a network card, or a network circuit communicatively connected to or forming part of a BS 103 (denoted by dashed line in FIG. 11), etc. operating in a 5G communications system environment 115, although the improved UCI receiver 100 of the invention is not limited to operating in a 5G communications system but could comprise a UCI receiver for a 4G cellular network or any cellular network. The BS 103 communicates with one or more UEs 125.

The UCI receiver 100 may comprise a plurality of functional blocks for performing various functions thereof. For example, the UCI receiver 100 includes receiver module 110 providing received signal processing and configured to provide received signals and/or information extracted therefrom to functional block module(s) 120 such as may comprise various data sink, control element(s), user interface(s), etc. Although receiver module 110 is described as providing received signal processing, it will be appreciated that this functional block may be implemented as a transceiver providing both transmitted and received signal processing. Irrespective of the particular configuration of receiver 110, embodiments include signal detection module 130 disposed in association with the receiver module 110 for facilitating accurate processing and/or decoding of a received channel signal in accordance with the invention. Channel signals may be received via an antenna module 105.

Although the signal detection module 130 is shown as being deployed as part of the receiver module 110 (e.g., comprising a portion of the receiver module control and logic circuits), there is no limitation to such a deployment configuration according to the concepts of the invention. For example, the signal detection module 130 may be deployed as a functional block of UCI receiver 100 that is distinct from, but connected to, receiver module 110. The signal detection module 130 may, for example, be implemented using logic circuits and/or executable code/machine readable instructions stored in a memory 140 of the UCI receiver 100 for execution by a processor 150 to thereby perform functions as described herein. For example, the executable code/machine readable instructions may be stored in one or more memories 140 (e.g., random access memory (RAM), read only memory (ROM), flash memory, magnetic memory, optical memory or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 140 may comprise processor-readable memories for use with respect to one or more processors 150 operable to execute code segments of signal detection module 130 and/or utilize data provided thereby to perform functions of the signal detection module 130 as described herein. Additionally, or alternatively, the signal detection module 130 may comprise one or more special purpose processors (e.g., application specific integrated circuit (ASIC), field programmable gate array (FPGA), graphics processing unit (GPU), and/or the like configured to perform functions of the signal detection module 130 as described herein.

Figure 12:
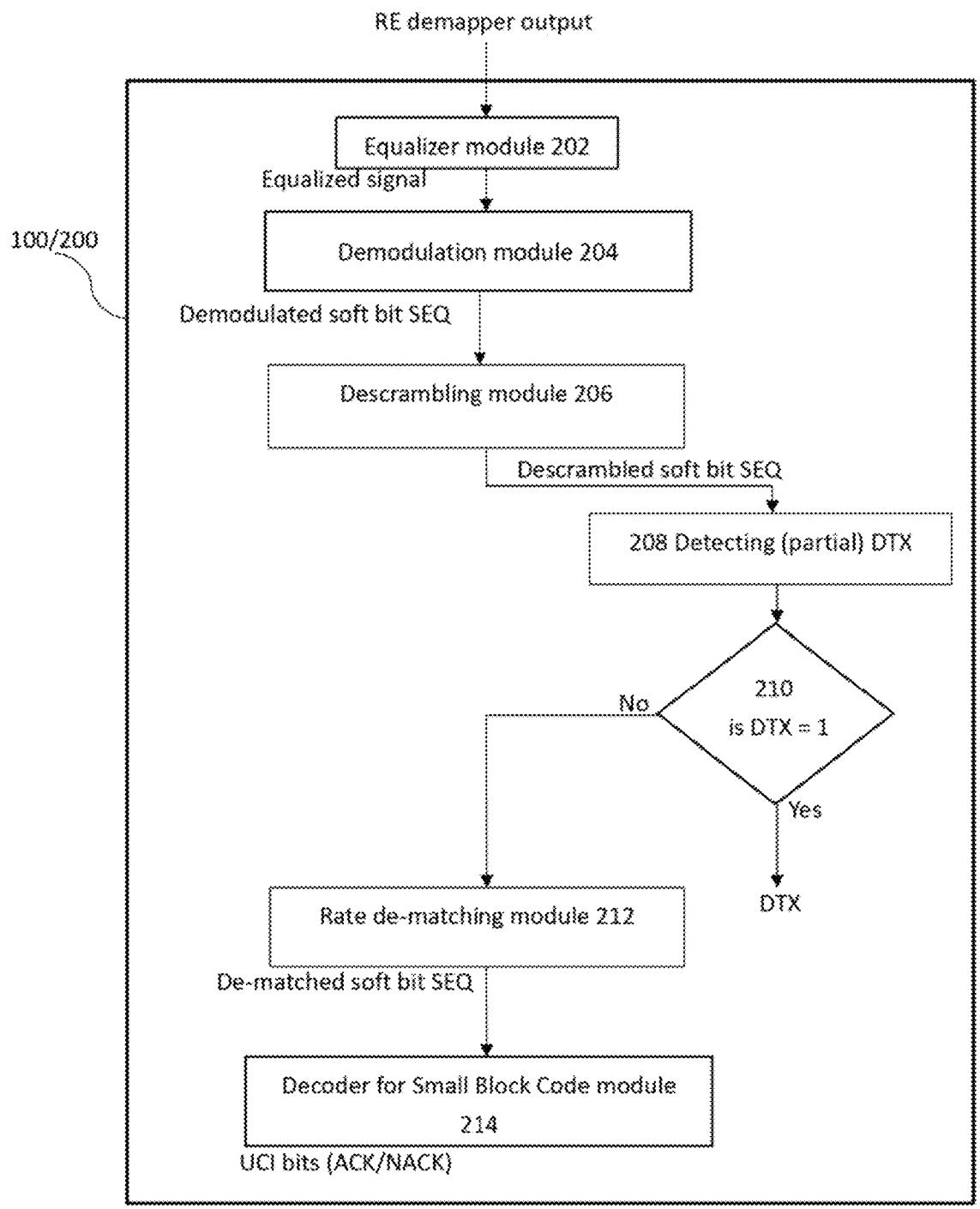
FIG. 12 is a schematic block diagram of the improved UCI receiver device in accordance with the invention illustrating in principle a method in accordance with the invention performed by said UCI receiver.

FIG. 12 a schematic block diagram of the improved UCI receiver device in accordance with the invention illustrating in principle a method in accordance with the invention by the signal detection module 130 (FIG. 11) for the improved linear block code-based UCI receiver 100/200. In one embodiment, the UCI receiver 100/200 is configured to receive a UL UCI signal as a demapper output signal. The demapper output signal is firstly equalized in a known manner in an equalizer module 202 to provide an equalized signal. The equalized signal is then demodulated, again in a known manner, by a demodulation module 204 which outputs soft bits comprising a demodulated soft bit SEQ to a descrambling module 206. The method of the invention comprises taking the descrambled soft bit SEQ outputted by the descrambling module 206 and processing said descrambled soft bit SEQ, in step 208, to distinguish whether a received linear block code signal is a partial DTX signal or a non-DTX signal. Then, in decision box 210, a determination is made on whether or not a DTX state is determined to have occurred. If the determination is in the affirmative, then processing of the received linear block code signal may be terminated. If the determination is negative, then the descrambled soft bit SEQ of the received linear block code signal is inputted to a rate de-matching module 212 which processes the descrambled soft bit SEQ in a known manner to output a de-matched soft bit SEQ to a decoder module 214 which, also in a known manner, generates UCI ACK/NACK bits.

It will be appreciated therefore that the method of the invention can be implemented in a conventional UCI receiver through any of software, firmware and/or hardware changes to the conventional UCI receiver and is preferably implemented only by way of software changes.

As described in greater detail below with respect to FIGS. 13 and 14, the signal detection module 130 of the UCI receiver 100/200 is configured to implement the steps of the method in accordance with the invention to distinguish whether a received linear block code signal is a partial DTX signal or a non-DTX signal. From this, it can be determined if a (partial) DTX state has occurred.

Figure 13:
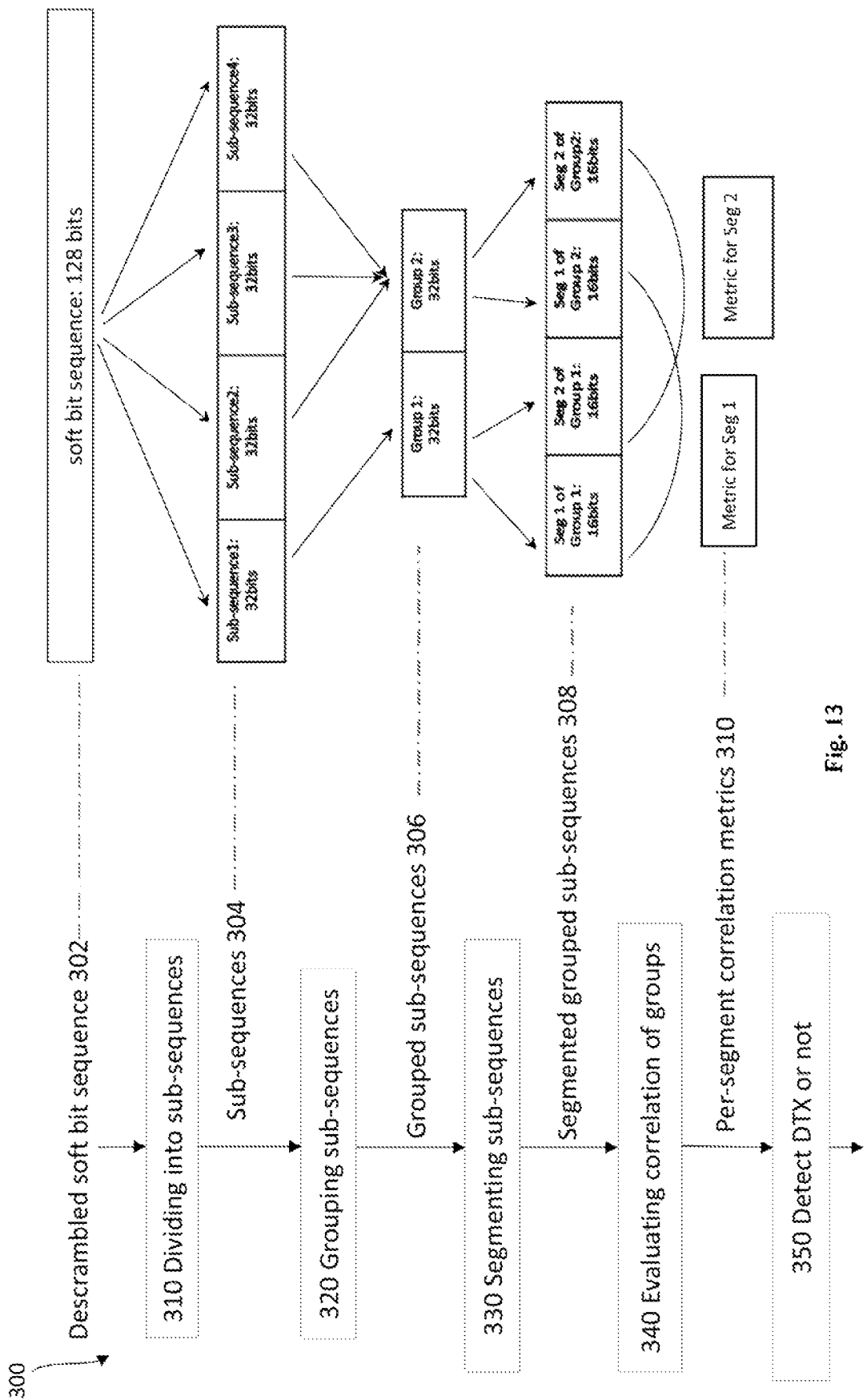
FIG. 13 diagrammatically illustrates the main steps of the method of FIG. 12.

Referring to FIG. 13, shown are the main steps of a method 300 in accordance with the invention. The descrambled soft bit sequence 302 comprising 128 soft bits is transformed, in a first step 310, into multiple sub-sequences 304. Preferably, the descrambled soft bit sequence 302 is transformed or divided into four sub-sequences 304 of a predefined length, i.e., each sub-sequence 304 having a length of 32 soft bits. Preferably, each 32 bit sub-sequence 304 comprises one copy of the descrambled linear block encoded signal. In the event that a length of a last one of the multiple sub-sequences 304 is less than the predefined length then the method may include either of padding said last one of the multiple sub-sequences 304 with zeros or omitting said last one of the multiple sub-sequences 304 from the further method steps. Preferably also, the predefined length comprises a linear block encoded signal encoded codeword length.

Whilst the preference in the method 300 is to perform grouping and segmenting steps before evaluating correlation metrics as will be described below, in one arrangement of the method 300, correlation metrics may be determined for two or more of the multiple sub-sequences 304 and, based on an evaluation of the determined correlation metrics, a determination is then made of whether or not a (partial) DTX state has occurred, i.e. a determination is made as to whether or not a received linear block encoded signal exhibits partial DTX.

Partial DTX causes randomness between the multiple sub-sequences 304 which leads to low correlation between said multiple sub-sequences 304. In this arrangement of the method 300, the invention takes advantage of the low correlation between said multiple sub-sequences 304 to determine whether or not a received linear block encoded signal exhibits partial DTX. This may be achieved by comparing said correlation metrics to each other or by comparing said correlation metrics to one or more selected, calculated or predetermined thresholds Th.

Preferably, however, the method 300 includes a step 320 of grouping the multiple sub-sequences 304 into sub-sequence groups 306, also referred to as grouped sub-sequences 306. In this example, the grouping step 320 groups a first of the sub-sequences 304 into a first sub-sequence group "Group 1" having a length of 32 soft bits and the three remaining sub-sequences 304 into a second sub-sequence group "Group 2" also having a length of 32 soft bits. Group 2 may be derived by combining corresponding entries or bits with the same index from the three remaining sub-sequences 304. This may be achieved by summation of the values of the corresponding soft bits, calculating the average mean values of the corresponding soft bits, calculating the normal values of the corresponding soft bits, or other statistical combination methods. It will be understood that the Group 1 and Group 2 sub-sequence groups may comprise different derivations or combinations of the sub-sequences 304. It is preferred that the four sub-sequences 304 are grouped into only two sub-sequence groups 306. In one arrangement of the method 300, the correlation metrics 310 may be determined for two or more of the sub-sequence groups 306, and, based on an evaluation of the determined correlation metrics, a determination is then made of whether or not a (partial) DTX state has occurred.

The benefit of the grouping step 320 is that randomness in channel noise also causes low correlation. The grouping step 320 therefore can average out such randomness and thereby make the randomness caused by (partial) DTX more evident, i.e., less difficult to detect a partial DTX signal.

Preferably further, however, the method 300 includes a step 330 of segmenting each sub-sequence group 306 into sequence segments 308, also referred to as segmented grouped sub-sequences 308. Preferably, each of the Group 1 and Group 2 sub-sequence groups 306 is segmented into 16 bit sequence segments as shown in FIG. 13. The segmenting step 330 may include segmenting each sub-sequence group 306 into a predefined number of sequence segments 308. The predefined number of sequence segments is preferably 2. The segmenting step 330 may comprise forming a first half of a sub-sequence group 306 into a first sequence segment 308 and a second half of the sub-sequence group 306 into a second sequence segment 308 for that sub-sequence group 306. In some instances, a whole sub-sequence group 306 can be treated as comprising a sequence segment 308. Segmenting each sub-sequence group 306 into a predefined number of sequence segments 308 may comprise treating each part of a sub-sequence group 306 that corresponds to an RB as one sequence segment 308.

Then, in step 340, determining and evaluating correlation metrics 310 for the sequence segments 308 of two or more of the sub-sequence groups 306 and, in step 350, detecting if a (partial) DTX state has occurred from the evaluation of the determined correlation metrics 310.

The correlation metric ρ is derived from the cosine similarity:

$$\rho_{xy} = \frac{x \cdot y}{\|x\|\|y\|}$$

where x and y are two vectors;
x·y comprises the dot product of x and y;
$\|x\|$ is the magnitude of x; and
$\|y\|$ is the magnitude of y.

Preferably, correlation metrics 310 are calculated for each sequence segment 308 of the two sequence groups 306, Group 1 and Group 2. A per segment correlation metric for segment 1 of Group 1 and segment 1 of Group 2 may comprise a product of the correlation metrics 310 for said two segments where said resultant segment 1 correlation metric is compared to a selected, calculated or predetermined threshold Th to determine if a partial DTX state has occurred. In a similar manner, a per segment correlation metric for segment 2 of Group 1 and segment 2 of Group 2 may comprise a product of the correlation metrics 310 for said two segments and the resultant segment 2 correlation metric then compared to a same threshold Th or to a different respective threshold Th. Alternatively, each of the correlation metrics 310 for segment 1 of Group 1 and segment 1 of Group 2 may be separately compared to a same threshold Th or to respective different thresholds Th where, if either of the comparisons suggest a (partial) DTX state has occurred, then such a state is determined as having occurred. Processing of the received linear block encoded signal may be terminated once it is determined that a (partial) DTX state has occurred.

In one embodiment, the correlation metrics 310 may be calculated for pairs of sequence segments 308. Calculating the per-sequence segment correlation metric(s) 310 for the sub-sequence(s) 304 in the sub-sequence groups 306 may comprise identifying two sub-sequence groups 306 from all sub-sequence groups 306 as a group pair and calculating the per-segment correlation metric(s) 310 for the selected group pair. Identifying two sub-sequence groups 306 from all sub-sequence groups 306 as a group pair may comprise arbitrarily selecting any two sub-sequence groups 306 or selecting one sub-sequence group 306 and identifying it as a first sub-sequence group 306 and then selecting another sub-sequence group 306 from remaining sub-sequence groups 306 as a second sub-sequence group 306. This may also include selecting a sub-sequence group 306 with a lowest expected probability of DTX, selecting a sub-sequence group 306 corresponding to a first RB, or selecting a first occurring sub-sequence group 306.

The method may include obtaining the correlation metrics 310 for a group pair based on the correlation metrics for all or some of the sequence segments 308 comprising said group pair. This may comprise calculating combinations of the correlation metrics for all or some of the sequence segments 308 comprising said group pair for combined sequence segments 308. The combinations of the correlation metrics may be calculated based on any of the summed values of the combined correlation metrics, the average of the values of the combined correlation metrics, the normal values of the combined correlation metrics, the product of the combined correlation metrics or by other suitable statistical combination methods.

The segmenting step 330 takes advantage of the fact that some copies of the descrambled signal as shown in FIG. 8 are only partially randomized on a granularity level of 1 RB. Segmenting a copy of the descrambled signal into single RB-segments can capture this characteristic and make (partial) DTX less difficult to detect.

In the foregoing, the correlation metric may comprise any one or any combination of a cosine similarity; a correlation coefficient, optionally the Pearson correlation coefficient; and a distance characteristic or value, optionally a Euclidean Distance.

Soft bits preserve characteristics of the linear block encoded signal that are not preserved by hard bits so there are unexpected advantages to evaluating correlation metrics based on soft bits rather than hard bits. Furthermore, soft bits are less sensitive to SNR.

The method 300 of the invention therefore includes comparing the determined correlation metrics 310 to at least one selected, calculated or predetermined threshold Th such that if any, some or all of said determined correlation metrics 310 is less than or equal to said at least one threshold Th then a DTX state is determined to have occurred.

The at least one threshold Th may comprise any of: a single threshold for all sub-sequence groups 306; different thresholds for different sub-sequence groups 306; multiple thresholds for one or more of the sub-sequence groups 306. The multiple thresholds Th for one of said sub-sequence groups 306 may comprise a respective threshold Th for each sequence segment 308 of said sub-sequence group 306.

Figure 14:
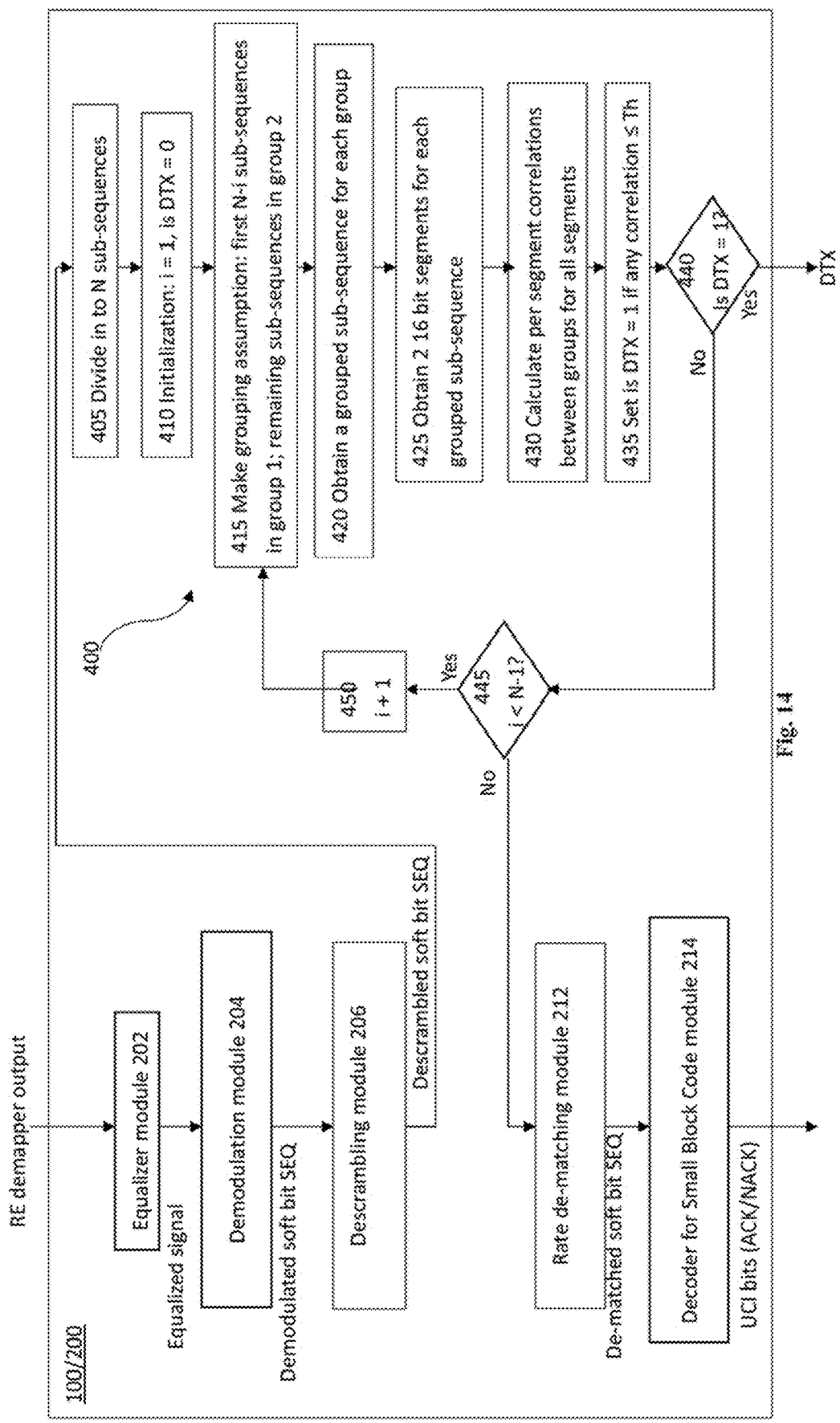
FIG. 14 is a schematic block diagram of the improved UCI receiver device in accordance with the invention showing the detailed steps of the method in accordance with the invention.

FIG. 14 is a schematic block diagram of the improved UCI receiver device 100/200 showing the detailed steps of the method in accordance with the invention.

The method 400 comprises a first step 405 of dividing the 128 bit descrambled soft bit SEQ 302 into N sub-sequences 304 where N is a number of the multiple sub-sequences 304 comprising the soft bit sequence 302. N is preferably 4. In an initialization step 410, an iterative value i is set to a value of "1" and DTX is assumed to have a value of "0" meaning that it is assumed that no DTX state has occurred or has been detected or determined.

Figure 15:
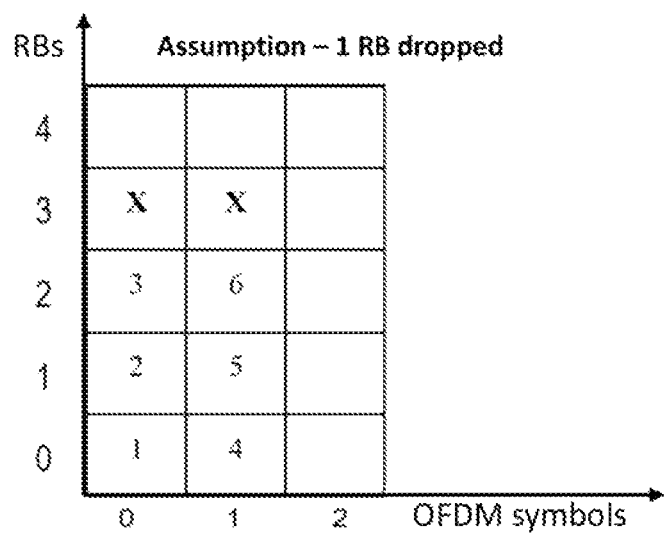
FIG. 15 illustrates the grouping and segmenting steps of the method of FIG. 13 with respect to the RE map of FIG. 7 where a first partial DTX state is assumed to have occurred.
Figure 15:
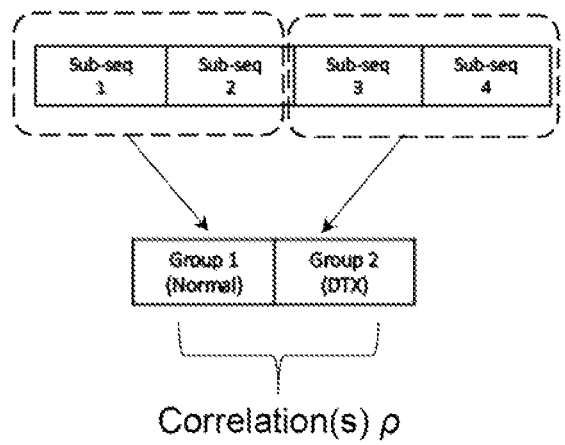

In a step 415, a grouping step assumption is made where the grouping assumption is preferably based on an assumed condition derived from potential DTX scenarios. For example, the assumed condition may comprise a number of RBs assumed as not being validly used due to the occurrence of a partial DTX state. Preferably, the method 400 is applied iteratively starting with a lowest value of the assumed condition. Therefore, as illustrated by FIG. 15, the assumed condition may be that one RB has been dropped in the transmission of the linear block encoded signal with the next iteration illustrated by FIG. 16 where the assumed condition is that two RBs have been dropped in the transmission of the linear block encoded signal.

Once the grouping assumption is made, a grouping step 420 is performed to group the multiple sub-sequences 304 into sub-sequence groups 306. This may comprise grouping N−n sub-sequences into a first sub-sequence group and grouping a remaining n sub-sequences into a second sub-sequence group, where n is determined based on the number of RBs not used due to the occurrence of a partial DTX state.

In step 425, the resultant two sub-sequence groups 306 are each segmented into two 16 bit sequence segments 308.

In step 430, the correlation metrics 310 are calculated for each sequence segment 308 and, in step 435, DTX is set as equal to a value of "1" if any evaluation of the correlation metrics 310 results in any correlation metric 310 or any correlation metric product being found to be less than or equal to one or more selected, calculated or predetermined thresholds Th.

At decision box 440, a determination is made as to whether or not DTX=1. If the determination is the affirmative, then it is determined that a partial DTX state has occurred which is treated as a DTX state. As such, the processing of the received the linear block encoded signal is terminated without the need to perform the conventional steps of rate de-matching and decoding. If at decision box 440, the determination is negative them the method 400 passes to decision box 445 where a determination is made as to whether or not i is less than N−1. If yes, the in step 450, the value of i is incremented by 1 and the method 400 iterates to step 415. If at decision box 445 it is determined that i=N then it is determined that the received the linear block encoded signal does not exhibit partial DTX and the received the linear block encoded signal continues with the conventional steps of rate de-matching and decoding to determine UCI bits for the received the linear block encoded signal.

FIG. 15 illustrates the steps 415 to 435 of method 400 of FIG. 14 where a first partial DTX state is assumed to have occurred such that if, any of the correlation metrics 310 or any of the correlation metric products is found to be less than or equal to the threshold Th, then another DTX assumption is implemented.

Figure 16:
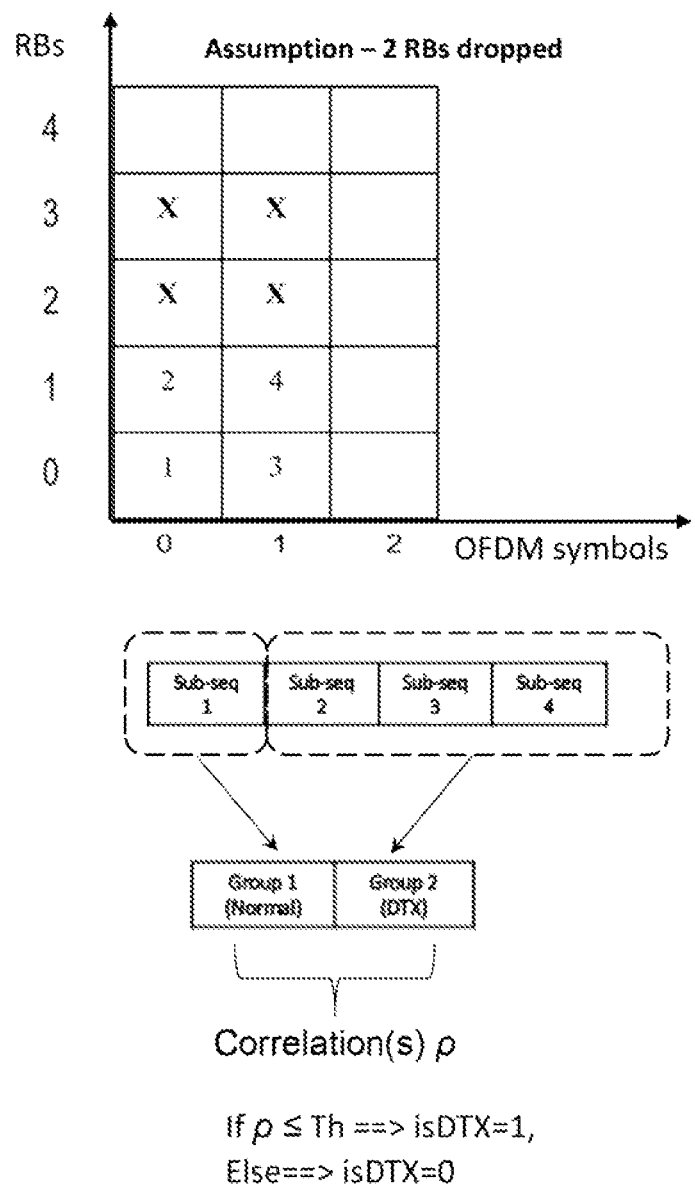
FIG. 16 illustrates the grouping and segmenting steps of the method of FIG. 13 with respect to the RE map of FIG. 9 where a second partial DTX state is assumed to have occurred.

FIG. 16 illustrates the steps 415 to 435 of method 400 of FIG. 14 where a second partial DTX state is assumed to have occurred such that if, any of the correlation metrics 310 or any of the correlation metric products is found to be less than or equal to the threshold Th, then a determination is made as to whether the received the linear block encoded signal exhibits partial DTX or not.

Figure 17:
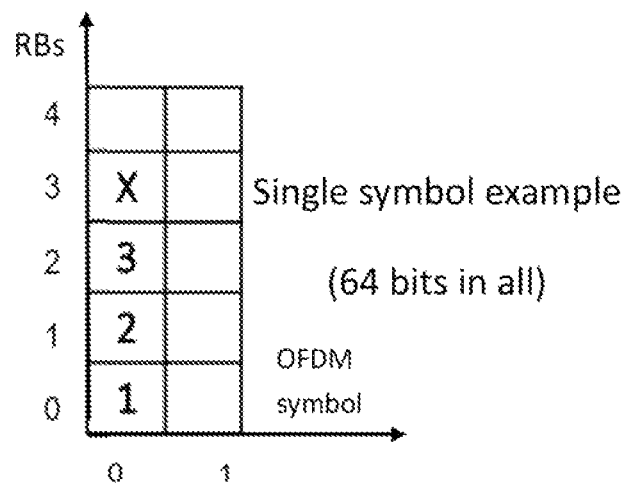
FIG. 17 illustrates the grouping and segmenting steps of the method of FIG. 13 with respect to a single symbol RE map.
Figure 17:
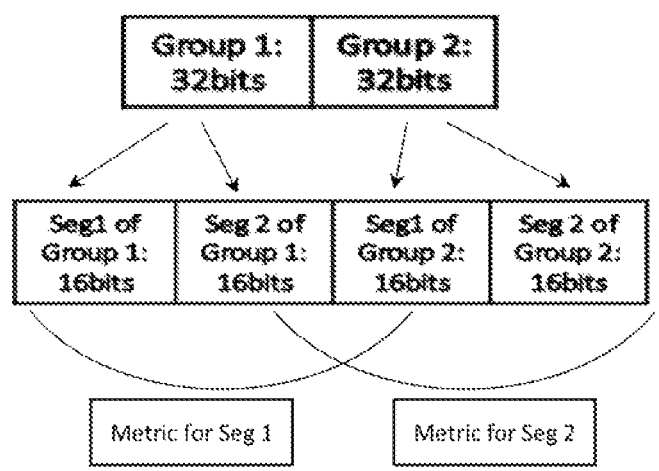

FIG. 17 illustrates the steps 415 to 435 of method 400 of FIG. 14 with respect to a single symbol RE map where a 32 bit sub-sequence (copy of the descrambled linear block encoded signal) is carried by two RBs and, if only one of the two RBs is DTX, then only half of the sub-sequence comprises noise. The segmenting step 425 of method 400 is especially useful for 1 symbol cases where the number of random soft bits is much smaller than for other scenarios.

In the method 400, it can be seen that the grouping step 420 may comprise grouping the multiple sub-sequences 304 into a predefined number of sub-sequence groups 306 where each of the sub-sequence groups 306 has one or multiple sequence segments 308.

In the methods of the invention, the step of comparing one or more correlation metrics to one or more thresholds may be combined with other methods of determining the presence or existence of a DTX state or a partial DTX state.

The methods of the invention may include determining the presence or existence of a DTX state or a partial DTX state when any one of the following conditions is met: (i) all of the combined methods for determining the presence or existence of a DTX state or a partial DTX state indicate existence of a DTX state or a partial DTX state; (ii) at least one of the combined methods for determining the presence or existence of a DTX state or a partial DTX state indicate existence of a DTX state or a partial DTX state; or at least a predetermined number of the combined methods for determining the presence or existence of a DTX state or a partial DTX state indicate existence of a DTX state or a partial DTX state.

The linear block code may be Reed-Muller (RM) code or RM-based super code.

The invention provides a UCI receiver device 100 for a wireless communication system. The UCI receiver device 100 comprises a memory 140 storing machine-readable instructions and a processor 150 for executing the machine-readable instructions such that, when the processor ISO executes the machine-readable instructions, it configures the UCI receiver device 100 to implement the afore-described methods in accordance with the invention.

The invention provides a non-transitory computer-readable medium 140 storing machine-readable instructions, wherein, when the machine-readable instructions are executed by a processor 150, they configure the processor 150 to implement the afore-described methods in accordance with the invention.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of detecting a discontinuous transmission state (DTX) at an uplink control information (UCI) receiver in a wireless communication system, the method comprising:
   receiving a linear block encoded signal on an uplink (UL) at said UCI receiver;
   processing the received linear block encoded signal after resource element (RE) demapping to obtain a soft bit sequence;
   dividing the soft bit sequence into multiple sub-sequences;
   determining correlation metrics for two or more of the multiple sub-sequences; and
   determining if a DTX state has occurred by evaluating the determined correlation metrics for the two or more of the multiple sub-sequences.

2. The method of claim 1 wherein the step of determining correlation metrics further comprises:
   segmenting each sub-sequence into sequence segments; and
   determining correlation metrics for sequence segments of two or more of the sub-sequences;
   wherein a determination of whether or not a DTX state has occurred is obtained by evaluating the determined correlation metrics for the sequence segments of the two or more sub-sequences.

3. The method of claim 1, wherein the step of determining correlation metrics further comprises:
   grouping the multiple sub-sequences into sub-sequence groups; and
   determining correlation metrics for two or more of the sub-sequence groups;
   wherein a determination of whether or not a DTX state has occurred is obtained by evaluating the determined correlation metrics for the two or more sub-sequence groups.

4. The method of claim 3, wherein the step of grouping the multiple sub-sequences into sub-sequence groups comprises, for each sub-sequence group, any of:
   combining corresponding entries from each of the multiple sub-sequences grouped to form the sub-sequence group, where the corresponding entries have a same index value;
   summing values of corresponding entries from each of the multiple sub-sequences grouped to form the sub-sequence group, where the corresponding entries have a same index value;
   averaging values of corresponding entries from each of the multiple sub-sequences grouped to form the sub-sequence group, where the corresponding entries have a same index value;
   determining normal values of corresponding entries from each of the multiple sub-sequences grouped to form the sub-sequence group, where the corresponding entries have a same index value; or statistically compiling corresponding entries from each of the multiple sub-sequences grouped to form the sub-sequence group, where the corresponding entries have a same index value.

5. The method of claim 3, wherein the grouping step comprises grouping the multiple sub-sequences into sub-sequence groups based on an assumed condition derived from potential DTX scenarios.

6. The method of claim 5, wherein the assumed condition comprises a number of resource blocks (RBs) not being validly used due to occurrence of a partial DTX state.

7. The method of claim 5, wherein the method is applied iteratively starting with a lowest value of the assumed condition.

8. The method of claim 3, wherein the grouping step can be skipped by treating each of the multiple sub-sequences as a sub-sequence group.

9. The method of claim 3, wherein the grouping step comprises grouping the multiple sub-sequences into a predefined number of sub-sequence groups where each of the sub-sequence groups has one or multiple sub-sequences.

10. The method of claim 9, wherein the predefined number of sub-sequence groups is two and the method further comprises grouping N-n sub-sequences into a first sub-sequence group and grouping a remaining n sub-sequences into a second sub-sequence group, where N is a number of the multiple sub-sequences comprising the soft bit sequence and n is determined based on a number of RBs not used due to the occurrence of a DTX state.

11. The method of claim 1, wherein the step of determining correlation metrics further comprises:
grouping the multiple sub-sequences into sub-sequence groups;
segmenting each sub-sequence group into sequence segments; and
determining correlation metrics for sequence segments of two or more of the sub-sequence groups;
wherein a determination of whether or not a DTX state has occurred is obtained by evaluating the determined correlation metrics for the sequence segments of the two or more sub-sequence groups.

12. The method of claim 1, wherein the evaluating step comprises comparing the determined correlation metrics to at least one selected, calculated or predetermined threshold responsive to determining that any of said determined correlation metrics is less than or equal to said at least one selected, calculated or predetermined threshold then determining that a DTX state has occurred.

13. The method of claim 12, wherein processing of the received linear block encoded signal is terminated once it is determined that a DTX state has occurred.

14. The method of claim 12, wherein the at least one selected, calculated or predetermined threshold comprises any of: a single threshold for all sub-sequence groups; different thresholds for different sub-sequence groups; multiple thresholds for one or more of the sub-sequence groups.

15. The method of claim 14, wherein multiple thresholds for one of said sub-sequence groups comprises a respective threshold for each sequence segment of said sub-sequence group.

16. The method of claim 1, wherein the soft bit sequence is obtained after a signal descrambling process.

17. The method of claim 1, wherein the method comprises dividing the soft bit sequence into multiple sub-sequences of a predefined length and, responsive to determining that a length of a last one of the multiple sub-sequences is less than the predefined length then padding said last one of the multiple sub-sequences with zeros or omitting said last one of the multiple sub-sequences.

18. The method of claim 17, wherein the predefined length comprises a linear block encoded signal encoded codeword length.

19. An uplink control information (UCI) receiver in a wireless communication system, the UCI receiver comprising:
a memory storing machine-readable instructions; and
a processor for executing the machine-readable instructions such that, when the processor executes the machine-readable instructions, it configures the UCI receiver to:
process a linear block encoded signal received at said UCI receiver after resource element (RE) demapping to obtain a soft bit sequence;
divide the soft bit sequence into multiple sub-sequences;
determine correlation metrics for two or more of the multiple sub-sequences; and
determine if a DTX state has occurred by evaluating the determined correlation metrics for the two or more of the multiple sub-sequences.

20. A non-transitory computer-readable medium storing machine-readable instructions, wherein, when the machine-readable instructions are executed by a processor of a UCI receiver in a wireless communication system, they configure the processor to:
process a linear block encoded signal received at the UCI receiver after resource element (RE) demapping to obtain a soft bit sequence;
divide the soft bit sequence into multiple sub-sequences;
determine correlation metrics for two or more of the multiple sub-sequences; and
determine if a DTX state has occurred by evaluating the determined correlation metrics for the two or more of the multiple sub-sequences.

* * * * *